US007156007B1

(12) United States Patent
Albin et al.

(10) Patent No.: US 7,156,007 B1

(45) **Date of Patent: *Jan. 2, 2007**

(54) DEVICE AND A PROCESS FOR COARSELY GRINDING HYDROUS POLYMER GELS

(75) Inventors: Detlef Albin, Moers (DE); Jürgen Schulte, Krefeld (DE); Uwe Günther, Deckenpfronn (DE)

(73) Assignee: Stockhausen GmbH, Krefeld (DE)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 08/650,709

(22) Filed: May 20, 1996

(51) Int. Cl.
*B26D 1/22* (2006.01)
*B26D 1/40* (2006.01)
*B26D 1/62* (2006.01)
*B29B 11/02* (2006.01)

(52) U.S. Cl. ......................... 83/302; 83/347; 83/435.2; 83/436.6; 83/663; 83/678; 264/160; 425/289

(58) Field of Classification Search .................. 83/302, 83/347, 673, 346, 298, 303, 408, 663, 678, 83/26, 37, 301, 343, 344, 435.2, 436.3, 436.6; 131/317; 172/19, 20; 264/160; 425/202, 425/289, 301, 306
See application file for complete search history.

(56) References Cited

U.S. PATENT DOCUMENTS

| | | | | |
|---|---|---|---|---|
| 127,235 | A * | 5/1872 | Heywood | 83/302 X |
| 558,063 | A * | 4/1896 | Gordon | 83/673 X |
| 691,499 | A * | 1/1902 | Snedden | 83/302 |
| 783,930 | A * | 2/1905 | Copland | 425/289 |
| 992,188 | A * | 5/1911 | Gawenda et al. | 83/425.1 X |
| 1,062,627 | A * | 5/1913 | Williams | 83/302 X |
| 1,313,224 | A * | 8/1919 | Hultberg | 83/105 |
| 1,340,225 | A * | 5/1920 | Howard | 225/2 |
| 1,394,342 | A * | 10/1921 | Overbury | 242/524 |
| 1,432,420 | A * | 10/1922 | Sheldon | 83/302 |
| 2,735,488 | A * | 2/1956 | Anderson et al. | 83/678 X |
| 2,835,920 | A * | 5/1958 | Smith et al. | 264/146 |
| 2,881,472 | A * | 4/1959 | Wilson | 425/297 |
| 2,881,836 | A * | 4/1959 | Thiem et al. | 83/25 |
| 3,217,575 | A * | 11/1965 | Anetsberger | 83/663 X |
| 3,283,633 | A * | 11/1966 | Finke et al. | 83/678 X |
| 3,496,820 | A * | 2/1970 | Utzmann et al. | 83/302 |
| 3,508,461 | A * | 4/1970 | Stream | 83/347 X |
| 3,566,735 | A * | 3/1971 | Greene | 83/347 X |
| 3,875,836 | A * | 4/1975 | Hutchinson et al. | 83/302 X |
| 3,880,030 | A * | 4/1975 | Rosengren | 83/302 X |

(Continued)

FOREIGN PATENT DOCUMENTS

| | | |
|---|---|---|
| DE | 35 39 385 C2 | 5/1986 |

(Continued)

*Primary Examiner*—Clark F. Dexter
(74) *Attorney, Agent, or Firm*—Smith Moore LLP

(57) ABSTRACT

The present invention relates to a device for crushing a hydrous polymer jelly, comprising two rolls (11,12) located axially parallel and rotating in opposite directions between which a nip (13) for the passage of the polymer gel (10) is formed. In order to achieve a more uniform and cheaper size reduction of polymer gels, the present invention proposes to form one roll as a cutting roll (11) which is provided with at least one axially extending cross cutting element (15) having a cutting edge (17) and with a radially extending longitudinal cutting element (14) provided with a cutting edge (18) which runs around it, and to form the other roll as a back-up roll (12).

4 Claims, 2 Drawing Sheets

U.S. PATENT DOCUMENTS

| | | | | |
|---|---|---|---|---|
| 3,971,277 | A * | 7/1976 | Kowalski et al. | 83/176 |
| 4,162,709 | A * | 7/1979 | Wilson | 83/663 X |
| 4,184,643 | A * | 1/1980 | McCort | 83/343 X |
| 4,193,272 | A * | 3/1980 | Bernard | 62/320 |
| 4,279,369 | A | 7/1981 | Passafiume | |
| 4,296,164 | A * | 10/1981 | Bemis et al. | 428/219 |
| 4,452,116 | A | 6/1984 | Kesten | |
| 4,598,619 | A * | 7/1986 | Leeper et al. | 83/346 X |
| 4,610,189 | A * | 9/1986 | Lombardo | 83/30 |
| 4,612,336 | A | 9/1986 | Yada et al. | |
| 4,682,523 | A * | 7/1987 | Johnson et al. | 83/347 X |
| 4,690,788 | A | 9/1987 | Yada et al. | |
| 4,734,238 | A | 3/1988 | Sugimori et al. | |
| 4,857,610 | A | 8/1989 | Chmelir et al. | |
| 4,893,999 | A | 1/1990 | Chmelir et al. | |
| 5,174,185 | A | 12/1992 | Aichele | |
| 5,189,935 | A | 3/1993 | Rosemann | |

FOREIGN PATENT DOCUMENTS

| | | | |
|---|---|---|---|
| DE | 35 06 534 | A1 | 7/1986 |
| DE | 35 06 543 | C2 | 8/1986 |
| DE | 35 44 770 | C2 | 6/1987 |
| DE | 38 33 834 | C1 | 10/1989 |
| DE | 39 00 414 | C2 | 7/1990 |
| DE | 39 24 053 | C2 | 1/1991 |
| WO | WO 92/08584 | | 5/1992 |

* cited by examiner

DEVICE AND A PROCESS FOR COARSELY GRINDING HYDROUS POLYMER GELS

The present invention relates to a device for crushing a hydrous polymer gel, comprising two rolls located axially parallel and rotating in opposite directions between which a nip for the passage of the polymer gel is formed. The present invention further relates to a process for carrying out coarse grinding.

Aqueous polymer gels are obtained from water-soluble monomers by means of solution polymerization in the production of water-soluble or water-swellable polymers. Industrial manufacturing processes for water-soluble polymers are known. These polymers are used as flocculation aids, dewatering and retention agents, as viscosity-increasing agents in aqueous media, for example, in tertiary oil recovery, or as grinding aids and dispersing agents. Manufacturing processes for the production of water-swellable polymers are also known; these polymers are used as superabsorbers in the hygienic and sanitary field, as soil conditioners in agriculture, or as sealants in the production of current-conducting and light-transmitting cables.

In general, the powder products are manufactured in a continuous process, for example, by radical polymerization of water-soluble polymers on an endless belt, as described in DE 35 44 770 C2, wherein hydrous polymer gels in soft, viscoplastic, or brittle state are obtained after polymerization.

Processing the polymer gels into powders is carried out in the subsequent stages of crushing, fine reduction, drying, and grinding; high effort is required if the polymer properties achieved in the gel state are to be maintained. A uniform process sequence, which is also required for this purpose, is already impaired by preliminary disintegration and comminution of the soft, viscoplastic, or brittle gels. For example, viscoplastic gel blocks or gel strands are torn to pieces of irregular size in kneaders, whereas size reduction of soft gels results in pieces of increasing dimensions with increasing plasticity, and the kneaders are frequently blocked by coiled gel pieces.

This results in a nonuniform material flow causing different layer thicknesses in screen belt drying and an insufficient or excessive drying of the polymer, which impairs the subsequent grinding and classifying process; on the other hand, keratinization of the polymer, for example, results in reduced solubility or swellability and therefore in performance loss of the product.

Moreover, when brittle crosslinked gels having a crosslinker content of more than 0.15%, relative to the total amount of monomers, are processed large amounts of excessively small gel particles are formed in conventional processing, and these reduce the yield of dry product in the required particle-size range, for example, of 1,000–3,000 μm, after drying and grinding.

To avoid the described drawbacks, particle-shaped polymers having a high molecular weight and good solubility are produced according to DE 35 06 543 C2 such that the polymer sheeting having a maximum layer thickness of 10 mm is first cut into strips having a width of 3 mm to 10 mm in a roller-type cutting device by means of a pair of rollers; their surface is provided with a plurality of annular projections or grooves arranged at given distances and they rotate in opposite directions. These strips are then cut into cubical pieces with a side length of 3 mm to 10 mm by means of a combination consisting of a stationary blade and a rotary cutting unit. The rotary cutting device has a pivoted cylindrical body whose circumference is provided with at least one blade.

According to the process of DE 35 06 543 C2 it is necessary to adjust the polymer concentration in case of acrylamide polymers in the range of 20 to 60%-wt., and in case of cationic polymers, which in particular form homopolymers having a very soft consistency, the monomer concentration to 50 to 85%-wt. To obtain gels in a processable state, it is further necessary according to this process to apply nonionic or anionic surface active agents on the polymer film, to blow in cold air so as to embrittle the gel mass by cooling, and, optionally, to predry the polymer film at 50–120° C. by means of hot air. Because of the cutting knives' arrangement the described process additionally requires an exact polymer layer thickness after polymerization. The mentioned process conditions require a great deal of expenditure with respect to both appliance and technique, which means cost.

It is accordingly the object of the present invention to find an improved device for coarse grinding hydrous polymer gels which permits uniform and inexpensive size reduction of soft, viscoplastic, or brittle polymer gels, as well as to develop a process which is suitable for uniform and inexpensive processing of aqueous polymer gels having different consistencies.

In order to achieve this object the present invention proposes to improve the device of the above-mentioned kind such that one roll is formed as a cutting roll which is provided with at least one axially extending cross cutting element having a cutting edge and with a radially extending longitudinal cutting element provided with a cutting edge which runs around it, and that the other roll is formed as a back-up roll.

The advantage of a device for crushing a hydrous polymer jelly which is formed according to this technical teaching is that the arrangement of cross cutting and slitting element on one roll provides a low-cost device which additionally reduces the gel in one single step so that size reduction can be carried out in a rapid and inexpensive way.

In order to achieve the above-mentioned object the present invention further proposes to improve the device of the above-mentioned kind such that one roll is formed as a cross cutting roller which is provided with at least one axially extending cross cutting element with a cutting edge, that the other roll is formed as a back-up roll, and that a longitudinal cutting roller with at least one radially extending slitting element provided with a cutting edge revolving around it is arranged ahead of the cross cutting roller.

The advantage of a device for crushing a hydrous polymer jelly which is formed according to this technical teaching is that the outlay in equipment, as compared with the art, is comparatively low, that cutting may be carried out with one single device, that cutting may be carried out in a very rapid and inexpensive way, and that separating the longitudinal and transverse cut into two subsequent steps provides a very clean cut.

According to a preferred embodiment of the present invention the width of the roll gap approximates the height of the cross cutting and/or longitudinal cutting elements. This involves the advantage that the cutting elements adjoin the back-up roller at least at one point of their rotation, ensuring clean cutting of the polymer gel.

The roll nip is variable to allow its exact adjustment in accordance with the polymer gel to be cut and the condition of the cutting elements. The whole back-up roll may, for instance, be displaced in relation and parallel to the cutting or cross cutting roll. According to a particularly preferred embodiment the rotational speed of the longitudinal cutter is higher than the conveying rate of the polymer gel. This avoids congestion.

According to another preferred embodiment the cutting elements are formed of a flat steel provided with a polish on one side, and their cross section is preferably formed in a plane or sickle-shaped manner. Thus the cutting edge strikes the surface of the gel layer at an angle of smaller than 90° and a clean and uniform cut is achieved.

To this end it is advantageous to distribute the cross cutting elements uniformly on the circumference of the cutting roll and to arrange them in parallel or in the form of a spindle to the cutting roll's longitudinal axis.

According to a particularly preferred embodiment of the device according to the present invention the back-up roll conveys the polymer gel and presses it against the cross cutting and/or slitting elements during the cutting process. The advantage of this is that the polymer gel is transported reliably and separated properly at the intended site.

One or several longitudinal cutting elements and one or several cross cutting elements may be fitted to the cutting roller so that the polymer gel may be cut into nearly any desired size.

According to another particularly preferred embodiment the surface of the back-up roll is coated with a plastic material. This plastic is intended, on the one hand, to protect the back-up roll from wear and damage, and simultaneously to realize good adhesion of the back-up roll to the polymer gel without impairing it. To this end, it is preferable to use polyethylene, polypropylene, or Teflon.

According to another particularly preferred embodiment the surface of the back-up roll is provided with depressions. These depressions are arranged such that they are able to receive the cutting edges of the cross cutting and/or slitting elements located on the cutting roller. This ensures that the cutting elements completely penetrate the polymer gel and effect clean separation thereof.

As another solution to achieve the above-mentioned object the present invention proposes a process for crushing hydrous polymer gels which coarsely grinds the hydrous polymer gel into polymer gel particles of given size immediately after polymerization without any auxiliary agents or additional technical measures, using a device according to the present invention.

This process is preferably carried out continuously.

It has been found that hydrous polymer gels of different composition and consistency, optionally immediately after polymerization, may be crushed with a device according to the present invention, without further auxiliaries or additional technical measures, into gel particles of predetermined size and be fed in a continuous flow of material to fine reduction and the subsequent processing stages of drying, grinding and classifying.

The advantage thereof lies in the fact that the process for crushing aqueous polymer gels and, in general, the working method for such polymer gels is rendered simpler and cheaper, in particular since further auxiliaries or measures become obsolete.

Whereas it is sufficient gel strength that guarantees size reduction in the known processes, the use of the device according to the present invention allows processing of soft and plastic polymer gels, for example, copolymers with a high cationic portion, cationic homopolymers, or of low-molecular polymers, provided that the aqueous polymer gels are capable of being sheared. The plasticity of the polymer gels is also of minor importance.

The method according to the present invention provides a uniform, trouble-free material flow in the following process stages, in particular during drying, grinding, and sieving the powders. In particular, the disadvantages resulting from excessive drying are avoided, and powder products of a constantly high quality are formed.

Additional advantages of the device and the process according to the present invention will become obvious from the description of the embodiments and the accompanying drawings. The above-mentioned features and those that will be described in the following may be realized according to the present invention either individually or in any combination with each other. It is understood that the mentioned embodiments do not represent a definitive listing but are intended to be illustrative. Embodiments of the present invention are shown in FIGS. 1 to 4 and will be illustrated in greater detail in the following.

The individual Figures partially show the subject matter of the present invention in an extremely schematic view, they are not true to scale. Some objects shown in the individual Figures are extremely scaled up to elucidate their structure.

Figure 1:
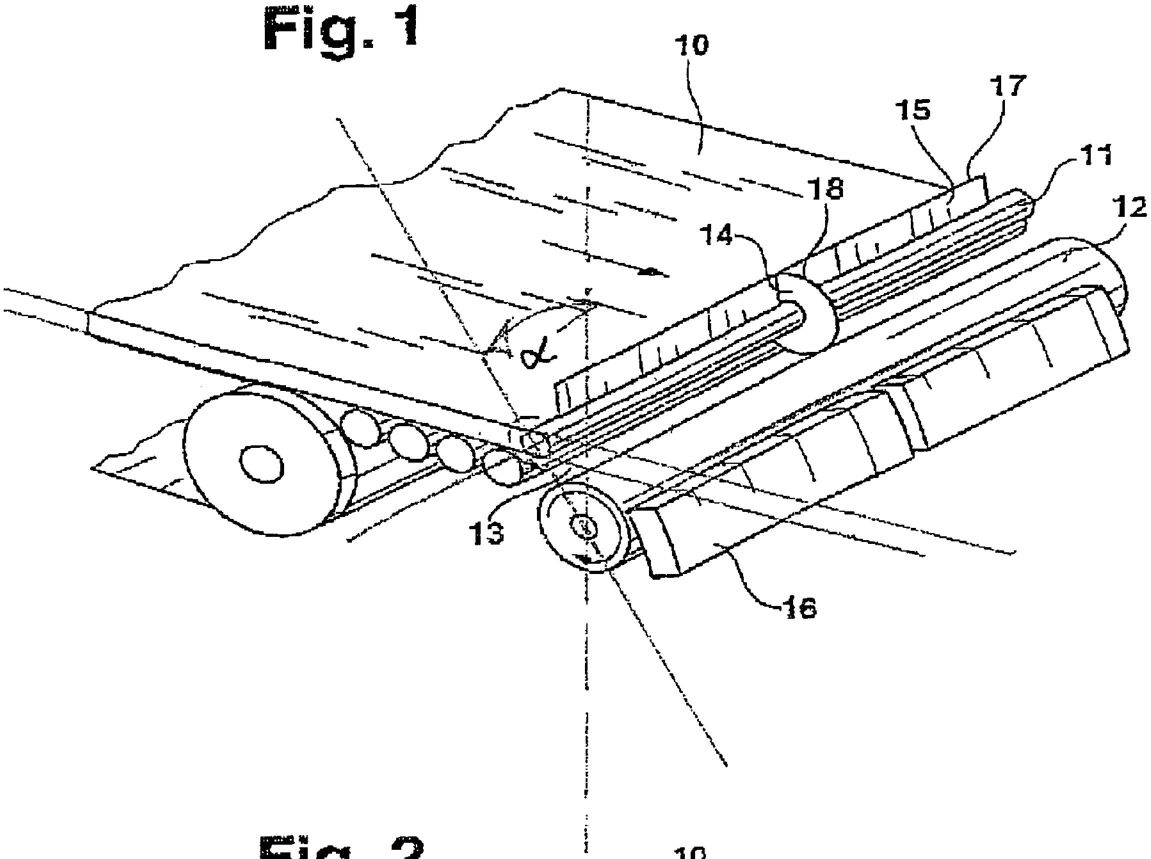
FIG. 1 shows a perspective representation of a first embodiment of a device according to the present invention for crushing hydrous polymer gels.

The first embodiment shown in FIG. 1 is preferably used for coarse grinding soft and/or plastic hydrous polymer gels 10. This polymer gel 10 is fed to the device as gel strand 10 of a maximum thickness of 10 mm. This gel strand 10 is guided in a roll nip 13 formed between a cutting roll 11 and a back-up roll 12. The circumferential cutting element 14 provided on the cutting roll 11 separates the gel strand 10 into two partial strands; the cross cutting element 15 also arranged on the cutting roll 11 separates cuboid-formed gel pieces 16 from each partial strand. The roll gap 13 is dimensioned such that the circumferential cutter 14 and the cross cutter 15 with its cutting edge 17 can be guided just along the back-up roll 12 without contacting it. The same applies to a cutting edge 18 running around the circumferential cutting element 14. The cutting roll 11 in this embodiment has one circumferential cutter 14 and one single cross cutter 15.

The roll gap 13 is adjustable so as to meet differing demands.

Figure 2:
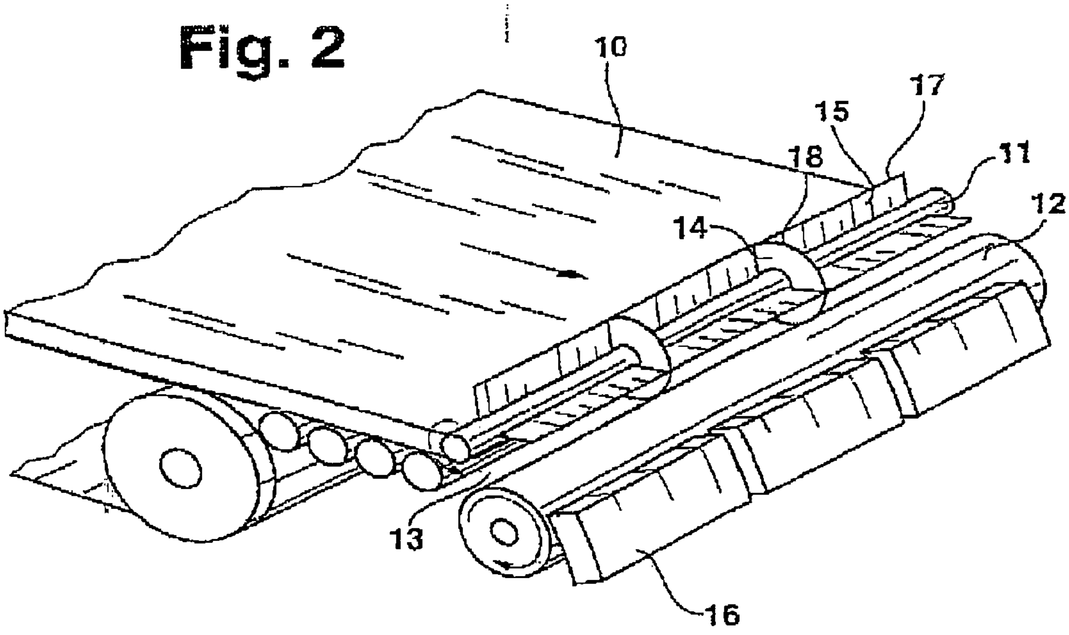
FIG. 2 shows a perspective representation of a second embodiment of the device according to the present invention having two longitudinal cutting elements and three cross cutting elements uniformly distributed over the circumference.

FIG. 2 shows a second embodiment comprising two circumferential cutters 14 and three cross cutters 15 equally spaced over the circumference of the cutting roller 11. As for the rest, this embodiment corresponds to the above-mentioned first embodiment.

This second embodiment is preferably used for crushing viscoplastic or brittle polymer gels.

Figure 3:
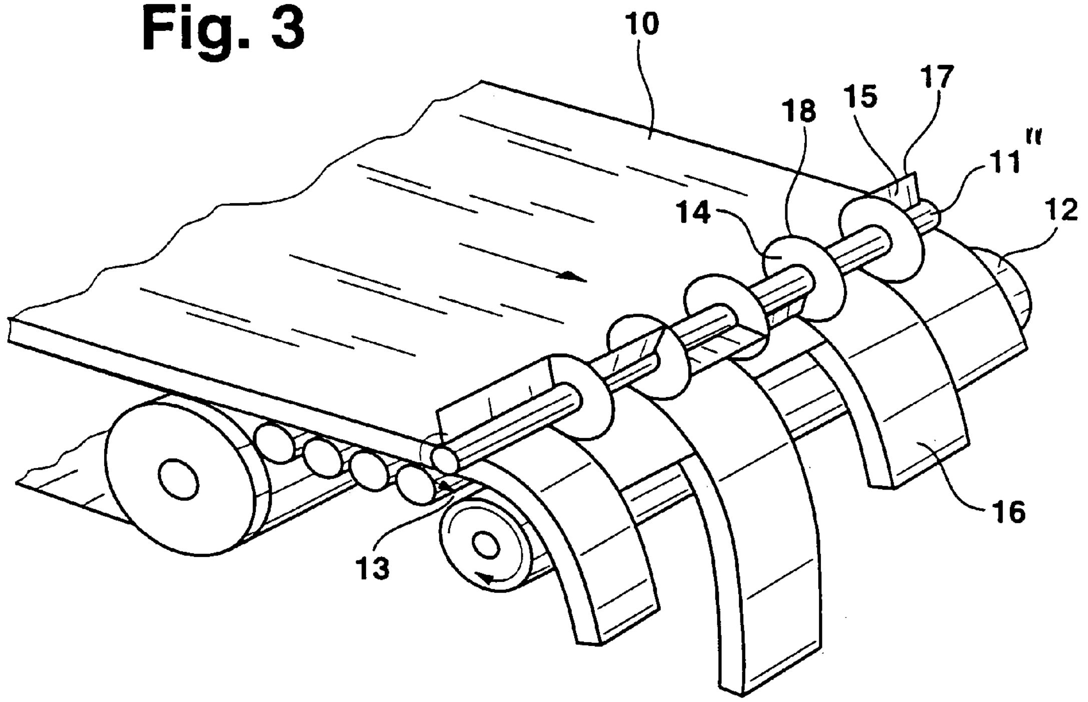
FIG. 3 shows a third embodiment of the device according to the present invention having five longitudinal cutters and a cross cutter staggered by 60° over the length of the cutting roll.

The third embodiment shown in FIG. 3 has five circumferential cutting elements 14 and one single cross cutting element 15. However, this cross cutter 15 is staggered on the circumference over the axial length of the cutting roller 11 by 60° each time.

Figure 4:
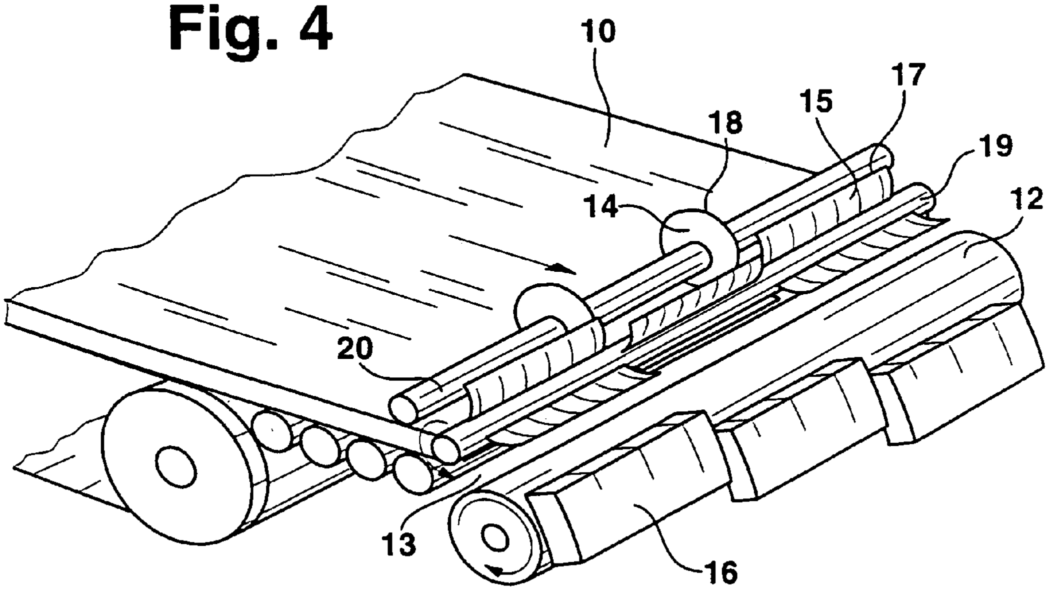
FIG. 4 shows a perspective representation of a fourth embodiment of the device according to the present invention, here the cross cutting and longitudinal cutting elements are located on two separate rolls.

The fourth embodiment shown in FIG. 4 is provided with a cross cutting roller 19 having three cross cutters 15 distributed over its circumference and with a longitudinal cutting roller 20 which has two slitting elements 14 and is arranged ahead of the cross cutting roller 19.

In this embodiment, the cross cutting elements 15 have a sickle-shaped cross section so that the cutting edge 18 strikes the surface of the polymer gel 10 at an angle of smaller than 90°.

Knives having a form and design which is known in principle are used as slitting elements 14; they preferably have a disk-shaped, circular form and are made, for example, of stainless steel and are arranged on the cutting roller 11, 20 in any desired manner or at a defined distance. The size of the circumferential cutting elements 14 is selected such that the complete polymer gel layer is cut through in each cutting process. Polymer gels, preferably band-like gel strands, with a layer thickness in the range of 3 to 500 mm, preferably of 3 to 150 mm, and further preferred of 10 to 130 mm, may be reduced in size by means of the device according to the present invention.

As cross cutting elements 15 flat steels are used which are polished on one side and whose surface is plane or, preferably, formed such that they have a sickle-shaped profile so that the cutting edge strikes the surface of the gel layer at an angle of smaller than 90°.

The cross cutting elements 15 may be arranged on the rotating shaft at any desired radial distance, with a different or preferably equal angular distance, in parallel, or in the form of a spindle, with respect to the rotation axis.

The size of the cross cutting elements 15 is chosen such that the polymer gels with the stated layer thickness and a width of 100 to 2,000 mm, preferably 100 to 800 mm, are separated in one operation, i.e. during one single passage of the polymer gel through the device.

The number and arrangement of the circumferential 14 and cross cutting elements 15 is variable and depends on the properties of the polymer gel to be processed and on the desired size of the gel portions whose length ranges from 100 to 200 mm and whose width ranges from 10 to 200 mm.

FIGS. 1 to 4 also show the operation of the device according to the present invention. During cutting the particles are obtained in a form depending on the number of circumferential and cross cutting elements 14 and 15 and on the conveying rate of the gel strand through the device. The illustrated shapes are obtained with identical conveying rate and circumferential speed of the slitting elements 14. To avoid congestion, however, the circumferential rate of the circumferential cutters 14 is usually chosen to be above the conveying rate of the polymer gel strand, which is of the order of 0.05 m/min. to 1.5 m/min., and preferably in the range of 0.1 to 0.5 m/min.

According to another embodiment of the device according to the present invention, which is not illustrated, the assembly of cutting elements may be arranged on several, preferably two or three pivoted rollers. For example, the device may consist of two rollers (cf. FIG. 4), the first roll 20 preferably having at least circumferential cutting element 14 and the second roll 19 having at least one cross cutting element 15.

The adhesion of gel particles to and between the cutting elements is prevented by the device according to the present invention without having to use any auxiliaries.

At least one back-up roll 12 provided with a nip 13 which is adjustable in accordance with the thickness of the gel layer to be processed is arranged in parallel to the circumferential and cross cutting elements 14 and 15; it transports the gel and presses it against the cutting edges 17,18 of the cutting elements 14,15 during the cutting process.

The surface of the back-up roll 12 is preferably coated with a plastic material, such as polyethylene, polypropylene, and/or Teflon, and preferably has a structure. Notches, wherein the cutting edges 17,18 of the cutting elements 14,15 may be guided, additionally ensure a thorough cut through the whole gel layer.

In a process according to the present invention using the device according to the present invention hydrous polymer gels of water-soluble or water-swellable homo- and copolymers or graft polymers are comminuted, preferably immediately after polymerization, into gel pieces of predetermined size which are then fed to the following fine reduction carried out, for example, in a grinder.

The mentioned hydrous polymer gels are formed by radical polymerization of water-soluble, monoolefinically and optionally polyolefinically unsaturated monomers. Examples thereof include α,β unsaturated mono- and dicarboxylic acids, such as acrylic acid, methacrylic acid, maleic acid, itaconic acid, and/or their sodium, potassium and/or ammonium salts; acrylic acid and methacrylic acid esters of aminoalkyl alcohols in quaternary salt form or as hydrosalts, such as dimethylaminoethyl (meth)acrylate-hydrochloride, dimethylaminoethyl (meth)acrylate-hydrosulfate, dimethylaminoethyl (meth)acrylate-methochloride, dimethylaminoethyl (meth)acrylate-methosulfate; acrylamide and methacrylamide and their N-mono- and N,N-dialkyl derivatives, such as (meth)acrylamidopropyl trimethylammonium chloride, (meth)acrylamidopropyl trimethylammonium methyl sulfate, as well as N-methylol (meth)acrylamide and its ethers partially or completely formed with $C_1$ to $C_4$-alcohols; (meth)acrylamidoalkyl sulfonic acids and/or their salts, such as 2-acrylamido-2-methylpropane sulfonic acid, hydroxyalkyl (meth)acrylates; as well as vinylsulfonic acid, (meth)allyl sulfonic acid, (meth)allyl alcohol sulfate, vinylphosphonic acid and/or their salts; N-vinyl amides, e.g. N-vinyl formamide, N-vinyl acetamide, N-vinyl-N-methylacetamide, and N-vinyl-N-methylformamide, diallyl dimethylammonium chloride, N-vinylpyrrolidone, N-vinyl imidazole, N-vinyl imidazoline, 2-methyl-1-vinyl imidazoline, 2-sulfoethyl (meth)acrylate; styrene phosphonic acid and styrene sulfonic acid and/or their salts.

Examples of multiply olefinically unsaturated compounds include acrylates and methacrylates of polyols, such as butanediol diacrylate, hexanediol di(meth)acrylate, polyglycol diacrylate, trimethylolpropane triacrylate, ethoxylated trimethylolpropane triacrylate, allyl acrylate, diallyl acrylamide, triallylamine, diallyl ether, methylenebisacrylamide, and functional compounds, such as polyglycide ether, epichlorohydrin.

The mentioned monomers may be copolymerized with one another in any desired ratio.

Water-containing gels of graft polymers are obtained by polymerizing at least one of the mentioned monomers with substrates, such as starch, cellulose or its derivatives, such as carboxymethyl- or hydroxyethylcellulose, polyvinyl alcohol or polyvinyl acetate partially saponified to polyvinyl alcohol.

Examples of such polymer gels include hydrous, viscoplastic high-molecular, ionic or nonionic or amphoteric mono- or copolymers which are used as flocculation, retention and/or thickening aids; brittle, cross linked mono- and copolymers which are used as superabsorbers for the production of hygienic, sanitary and incontinence articles, or in plant cultivation and agricultural production, for example, for soil conditioning. In case of brittle polymer gels, for example the Stokosorb®-products, the process according to the present invention reduces the fine-grain powder portion, which is disadvantageous in application, by about 20%-wt. in favor of the particle-size range of 200–1,000 μm.

The invention claimed is:

1. A device for processing hydrous polymer gel of variable thickness, comprising:

a first cutting roll having at least one axially extending cross cutting element including a cutting edge; and a back-up roll spaced from said cutting roll so as to form a nip, whereby said at least one cutting edge cooperates with said back up roll to cut a layer of hydrous polymer gel at the nip;

said first cutting roll being mounted above the rotational axis of said back-up roll such that a smallest distance between said cutting edge of the at least one cross cutting element and said back-up roll is situated below and upstream of a crown of the back-up roll with respect to a substantially linear conveying path of the layer of hydrous polymer gel as it approaches the nip, wherein when said cutting edge is positioned at said smallest distance, said cutting edge is positioned below and upstream of said crown, and wherein said cutting edge of said first cutting roll is a continuous cutting edge to completely separate a downstream portion of the hydrous polymer gel from the remainder of the hydrous polymer gel.

2. A device of claim 1, wherein said first cutting roll has at least one circumferentially extending cutting element including a cutting edge.

3. A device for processing hydrous polymer gel of variable thickness, comprising:

a first cutting roll having at least one axially extending cross cutting element including a cutting edge;

a back-up roll spaced from said cutting roll so as to form a nip;

said first cutting roll being mounted above the rotational axis of said back-up roll such that a smallest distance between said cutting edge of the at least one cross cutting element and said back-up roll is situated below and upstream of a crown of the back-up roll with respect to a substantially linear conveying path of a layer of hydrous polymer gel as it approaches the nip, wherein when said cutting edge is positioned at said smallest distance, said cutting edge is disposed below and upstream of said crown, and wherein said cutting edge of said first cutting roll is a continuous cutting edge to completely seDarate a downstream portion of the hydrous polymer gel from the remainder of the hydrous polymer gel; and a conveyor positioned and arranged to convey the layer of hydrous polymer gel along said conveying path to the nip, wherein said cutting edge of the at least one cross cutting element cooperates with said back-up roll to cut the layer of hydrous polymer gel at the nip.

4. A device of claim 3, wherein said first cutting roll has at least one circumferentially extending cutting element including a cutting edge.

* * * * *

UNITED STATES PATENT AND TRADEMARK OFFICE

CERTIFICATE OF CORRECTION

PATENT NO. : 7,156,007 B1
APPLICATION NO. : 08/650709
DATED : January 2, 2007
INVENTOR(S) : Detlef Albin et al.

It is certified that error appears in the above-identified patent and that said Letters Patent is hereby corrected as shown below:

Column 8,

Claim 3, line 20, "seDarate" should read -- separate --.

Signed and Sealed this

Fifth Day of June, 2007

JON W. DUDAS
*Director of the United States Patent and Trademark Office*